United States Patent Office.

IMPROVEMENT IN THE MANUFACTURE OF BRICK OR BUILDING BLOCKS.

HENRY W. ANGELL, OF WAUKESHA, WISCONSIN.

Letters Patent No. 60,320, dated December 11, 1866.

*The Schedule referred to in these Letters Patent and making part of the same.*

TO ALL WHOM IT MAY CONCERN:

Be it known that I, HENRY W. ANGELL, of Waukesha, in the county of Waukesha, and State of Wisconsin, have invented a new and useful process for the Manufacture of Bricks; and I hereby declare that the following is a full, clear, and exact description thereof.

I take quick-lime and slake it by the usual process; I then mix it thoroughly with sand, gravel, and small stones, in proportion from five to forty parts of sand, gravel, &c., to one part of lime, being governed by the strength of the lime, using a greater or less amount of sand and gravel, as the lime may be strong or weak, and using a sufficient quantity of water to form a mortar. After the above named ingredients are thoroughly incorporated, the composition thus formed is ready to be moulded into bricks. The moulds in which the bricks are made may be of any form or size, suitable for making bricks of any form or size that may be desired for building purposes, the entire top and bottom of the moulds being open. The said moulds are placed on the ground, (which has been previously prepared by being levelled and having sand sprinkled over it,) and filled with the composition, care being taken to place the larger stones and gravel as near the centre of the moulds as possible, which may be done with a trowel after the moulds are filled. In from fifteen to twenty minutes after the moulds have been filled the composition will have become set, so that they may be lifted off and removed, leaving the bricks on the ground, in which position they are allowed to remain, and in from three to five days they will be in a fit condition to be laid in the walls of a building.

I do not claim a building brick composed of lime and sand alone, made into mortar, moulded, and dried, which has long been in use; but what I do claim as my invention, and desire to secure by Letters Patent, is—

A brick composed of lime, sand, small stones, and gravel, prepared and moulded in the manner described.

HENRY W. ANGELL.

Witnesses:
J. B. BATES,
J. M. WHITE.